(12) United States Patent
Baney et al.

(10) Patent No.: US 6,535,289 B1
(45) Date of Patent: *Mar. 18, 2003

(54) SYSTEM AND METHOD FOR OPTICAL HETERODYNE DETECTION OF AN OPTICAL SIGNAL

(75) Inventors: Douglas M. Baney, Palo Alto, CA (US); Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 09/586,404

(22) Filed: Jun. 2, 2000

(51) Int. Cl.$^7$ ................................. G10B 9/02
(52) U.S. Cl. ..................................... 356/484
(58) Field of Search ................. 356/484, 477, 356/451

(56) References Cited

U.S. PATENT DOCUMENTS

| | | | |
|---|---|---|---|
| 4,856,899 A | 8/1989 | Iwaoka et al. | |
| 5,365,335 A | 11/1994 | Sorin | |
| 6,256,103 B1 | * 7/2001 | Sorin et al. | ................. 356/484 |

FOREIGN PATENT DOCUMENTS

EP 1130815 9/2001

* cited by examiner

*Primary Examiner*—Samuel A. Turner
*Assistant Examiner*—Patrick Connolly (57) ABSTRACT

An optical heterodyne detection system includes an optical pre-selector that has an adjustable passband which is adjusted to track the wavelength of a swept local oscillator signal. In an embodiment, an input signal is combined with a swept local oscillator signal and the combined optical signal is filtered by the optical pre-selector. In another embodiment, the input signal is filtered by the optical pre-selector before the input signal and the swept local oscillator signal are combined. Filtering the input signal or the combined input signal and the swept local oscillator signal to pass a wavelength band that tracks the wavelength of the swept local oscillator signal reduces the noise contributed from WDM signals and increases the dynamic range of the optical heterodyne detection system. An embodiment of the optical heterodyne detection system includes an optical combining unit, an optical pre-selector for the combined input and swept local oscillator signals, and a photodetector. Another embodiment of the optical heterodyne detection system includes an optical pre-selector for the input signal, an optical combining unit, and a photodetector.

12 Claims, 7 Drawing Sheets

SYSTEM AND METHOD FOR OPTICAL HETERODYNE DETECTION OF AN OPTICAL SIGNAL

FIELD OF THE INVENTION

The invention relates generally to the field of optical measurements and measuring systems, and more particularly to a system and method for optical heterodyne detection of an optical signal.

BACKGROUND OF THE INVENTION

Dense wavelength division multiplexing (DWDM) requires optical spectrum analyzers (OSAs) that have higher spectral resolution than is typically available with current OSAs. For example, grating-based OSAs and autocorrelation-based OSAs encounter mechanical constraints, such as constraints on beam size and the scanning of optical path lengths, which limit the resolution that can be obtained.

Figure 1:
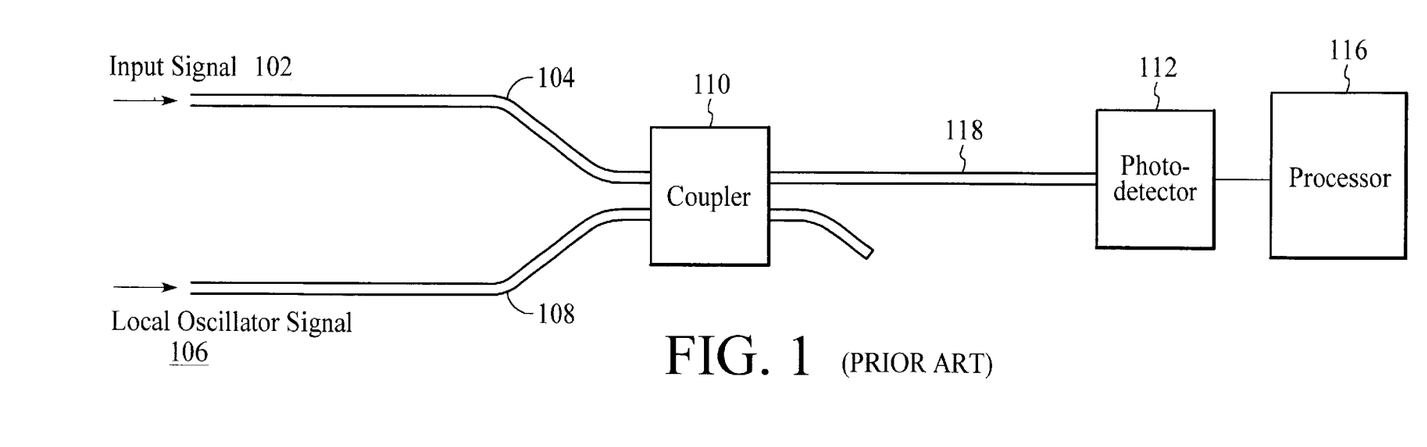
FIG. 1 is a depiction of an optical heterodyne detection system that includes a single photodetector in accordance with the prior art.

As an alternative to grating-based and autocorrelation-based OSAs, optical heterodyne detection systems can be utilized to monitor DWDM systems. FIG. 1 is a depiction of a prior art optical heterodyne detection system. The optical heterodyne detection system includes an input signal 102, an input waveguide 104, a local oscillator signal 106, a local oscillator waveguide 108, an optical coupler 110, an output waveguide 118, a photodetector 112, and a signal processor 116. The principles of operation of optical heterodyne detection systems are well known in the field of optical heterodyne detection and involve monitoring the heterodyne term that is generated when an input signal is combined with a local oscillator signal. The heterodyne term coexists with other direct detection signals, such as intensity noise from the input signal and intensity noise from the local oscillator signal.

Optical heterodyne detection systems are not limited by the mechanical constraints that limit the grating based and autocorrelation based OSAs. The spectral resolution of an optical heterodyne system is limited by the linewidth of the local oscillator signal, which can be several orders of magnitude narrower than the resolution of other OSAs.

In order to improve the performance of optical heterodyne detection systems with regard to parameters such as sensitivity and dynamic range, it is best for the heterodyne signal to have a high signal-to-noise ratio. However, the signal-to-noise ratio of the heterodyne signal is often degraded by noise that is contributed from the direct detection signals, especially in the DWDM case where the input signal includes closely spaced carrier wavelengths. One technique for improving the signal-to-noise ratio of the heterodyne signal, as described in U.S. Pat. No. 4,856,899, involves amplifying the input signal before the input signal is combined with the local oscillator signal in order to increase the amplitude of the heterodyne signal. Although amplifying the input signal increases the amplitude of the heterodyne signal, the amplification also increases the intensity noise of the input signal and may not improve the signal-to-noise ratio of the heterodyne signal.

In view of the prior art limitations in optical heterodyne detection systems, what is needed is an optical heterodyne detection system that generates a heterodyne signal with an improved signal-to-noise ratio.

SUMMARY OF THE INVENTION

An optical heterodyne detection system includes an optical pre-selector that has an adjustable passband which is adjusted to track the wavelength of a swept local oscillator signal. In an embodiment, an input signal is combined with a local oscillator signal and the combined optical signal is filtered by the optical pre-selector. In another embodiment, the input signal is filtered by the optical pre-selector before the input signal and the swept local oscillator signal are combined. Filtering the input signal or the combined input signal and the swept local oscillator signal to pass a wavelength band that tracks the wavelength of the swept local oscillator signal reduces the noise contributed from wavelength division multiplexed (WDM) signals and increases the dynamic range of the optical heterodyne detection system.

An embodiment of the optical heterodyne detection system includes an optical combining unit, an optical pre-selector for the combined input and swept local oscillator signals, and a photodetector. In the embodiment, the input signal and the swept local oscillator signal are combined in the optical combining unit to create a combined optical signal. The optical combining unit includes one output for outputting a beam of the combined optical signal to the optical pre-selector. The optical pre-selector filters the beam of the combined optical signal and the passband of the optical pre-selector is adjusted to track the wavelength of the swept local oscillator signal. The photodetector is optically arranged to receive the filtered beam and generates electrical signals in response to the filtered beam. In an embodiment, an attenuator is utilized to attenuate the input signal.

Another embodiment of the optical heterodyne detection system includes an optical pre-selector for the input signal, an optical combining unit, and a photodetector. In the embodiment, the optical pre-selector filters the input signal while the passband of the optical pre-selector is adjusted to track the wavelength of the swept local oscillator signal. After the input signal is filtered, the filtered input signal and the swept local oscillator are combined in an optical combining unit. The optical combining unit outputs a beam of the combined optical signal to the photodetector and the photodetector generates electrical signals in response to the combined optical signal. In an embodiment, an attenuator is utilized to attenuate the input signal.

A method for monitoring an optical signal utilizing an optical heterodyne detection system involves combining the input signal and the swept local oscillator signal to create a combined optical signal and outputting the combined optical signal. An electrical signal is generated in response to the combined optical signal and the electrical signal is processed to determine an optical characteristic represented by the input signal. One of the combined optical signal, the input signal, and the swept local oscillator signal is filtered to pass a wavelength band that tracks the wavelength of the swept local oscillator signal. In an embodiment of the method, the combined optical signal is filtered and an electrical signal is generated in response to the filtered combined optical signal. In another embodiment of the method, the input signal is filtered and the filtered input signal is combined with the swept local oscillator signal to generate the combined optical signal. In an embodiment of the method, filtering of the optical signals is adjusted in real-time to track the wavelength change of the swept local oscillator signal. In an embodiment of the method, the input signal is attenuated before the input signal is combined with the swept local oscillator signal.

The optical heterodyne detection system and method provide an optical measurement system that is accurate over a wide range of wavelengths. The optical heterodyne detection system and method can be utilized for optical spectrum analysis to characterize an unknown input signal. The optical heterodyne detection system and method may also be utilized for optical network analysis in which a known signal is input into an optical network and the output signal is measured.

Other aspects and advantages of the present invention will become apparent from the following detailed description, taken in conjunction with the accompanying drawings, illustrating by way of example the principles of the invention.

DETAILED DESCRIPTION OF THE INVENTION

An embodiment of the invention involves an optical heterodyne detection system in which an input signal and a swept local oscillator signal are combined and output as a beam that includes the combined optical signal. The output beam is filtered by an optical pre-selector that passes a wavelength band that tracks the wavelength of the swept local oscillator signal. As the local oscillator signal sweeps across a wavelength range, filtering of the output beam is adjusted to track the wavelength of the swept local oscillator signal. Filtering the output beam to pass a wavelength band that corresponds to the wavelength of the swept local oscillator signal reduces the intensity noise contributed from light signals that are not near the wavelength of the swept local oscillator signal.

Another embodiment of the invention involves an optical heterodyne detection system in which the input signal is filtered by an optical pre-selector before the input signal is combined with the swept local oscillator signal. As with the first embodiment, the input signal is filtered to pass a wavelength band that tracks the wavelength of the swept local oscillator signal. As the local oscillator signal sweeps across a wavelength range, filtering of the input signal is adjusted to track the wavelength of the swept local oscillator signal.

Figure 2:
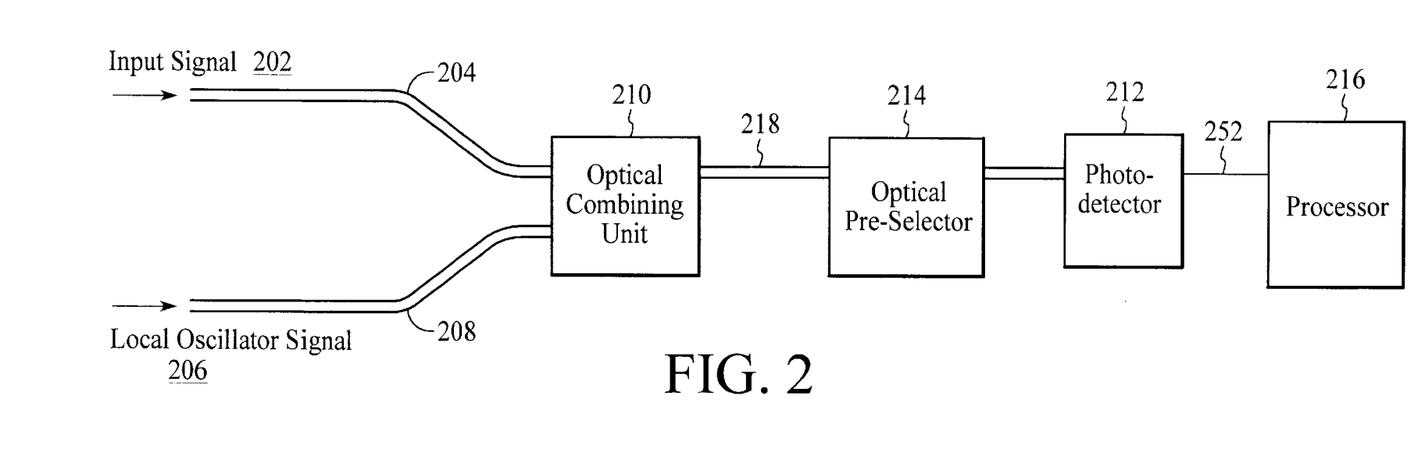
FIG. 2 is a depiction of an optical heterodyne detection system that includes an optical combining unit, an optical pre-selector, and a photodetector in accordance with the invention.

FIG. 2 depicts an embodiment of an optical heterodyne detection system in which the input signal and swept local oscillator signal are filtered after the two signals have been combined. The optical heterodyne detection system of FIG. 2 includes an input signal 202, a signal fiber 204, a local oscillator signal 206, a local oscillator fiber 208, an optical combining unit 210, an optical pre-selector 214, a photodetector 212, and a processor 216. It should be noted that throughout the description similar reference numerals are utilized to identify similar elements.

The input signal 202 and the local oscillator signal 206 include optical signals that are generated from conventional devices as is known in the field of optical communications systems. For example, the input signal and the local oscillator signal may be generated by lasers. The input signal may consist of a single wavelength or the input signal may include multiple wavelengths as is known in the field of wavelength division multiplexing. The input signal may be an optical signal having unknown optical characteristics, in which case the optical heterodyne detection system can be utilized for optical spectrum analysis. The input signal may alternatively be a delayed portion of the local oscillator signal that is utilized for optical network analysis. When the monitoring system is being utilized for optical network analysis, the characteristics of a network or a single network component can be determined by inputting a known input signal, such as a fraction of the local oscillator signal, into the network or the single network component and then measuring the response to the known signal.

The signal fiber 204 forms an optical path for carrying the input signal 202 that is to be detected by the system. In an embodiment, the signal fiber is a single mode optical fiber as is known in the art, although other optical waveguides may be utilized to form an optical path. In addition, although waveguides are described, optical signals may be input into the system, or transmitted within the system, in free space.

Preferably, the local oscillator signal 206 is a widely tunable optical signal generated from a wideband tunable laser. For example, the local oscillator signal may be tunable over a range of one nanometer or greater. During optical spectrum analysis, the local oscillator signal is typically swept across a range of wavelengths in order to detect the input signal over the range of wavelengths.

The local oscillator fiber 208 is an optical fiber, such as a single mode optical fiber, that forms an optical path for carrying the local oscillator signal 206. The local oscillator fiber may include a polarization controller (not shown) that controls the polarization state of the local oscillator signal. Other optical waveguides may be utilized in place of single mode optical fiber to form an optical path, such as polarization preserving fiber. Alternatively, the local oscillator signal may be transmitted through free space without the use of a waveguide.

The optical combining unit 210 optically combines the input signal 202 and the local oscillator signal 206 into a combined optical signal and outputs at least one beam of the combined optical signal into an optical path that is formed by output fiber 218. The combined optical signal includes the heterodyne signal and intensity noise from the input signal and from the local oscillator signal. In an embodiment, the input signal and the local oscillator signal are combined in a manner that ensures the spatial overlap of the input signal and the local oscillator signal, thereby allowing fall interference between the input signal and the local oscillator signal.

In an embodiment, the optical combining unit includes an optical coupler that outputs the combined optical signal into one optical path. The optical coupler may be an optically directional 3 dB fiber coupler, although other optical couplers may be utilized. In an embodiment, coupling of the optical signals is substantially independent of the polarization of optical signals. In an embodiment, the optical coupler does not polarize the combined optical signal. Although the optical combining unit is described below as outputting one beam of the combined optical signal, it should be understood that embodiments of the optical combining unit that output more than one beam of the combined optical signal are possible.

The optical pre-selector 214 is a tunable bandpass filter that is tuned to track the swept local oscillator signal 206. That is, the optical pre-selector is tuned so that the optical pre-selector has the highest optical transmission over a wavelength band that corresponds to the wavelength of the swept local oscillator signal. The optical pre-selector may be tuned to track the swept local oscillator signal utilizing known wavelength tracking techniques. In an embodiment, the center of the filter passband is tuned to the wavelength of the swept local oscillator signal. In another embodiment, the center of the filter passband is tuned slightly off the local oscillator wavelength in order to generate the heterodyne signal at a higher frequency, for example, in a situation where image rejection is important. Tunable optical pre-selectors, such as those described with reference to FIGS. 2–4 are well known in the field of optical communications and can be implemented utilizing components such as diffraction gratings, dielectric interference filters, periodic Bragg devices, such as tunable fiber Bragg gratings, Fabry-Perot interferometers, and other known interferometers.

Figure 3:
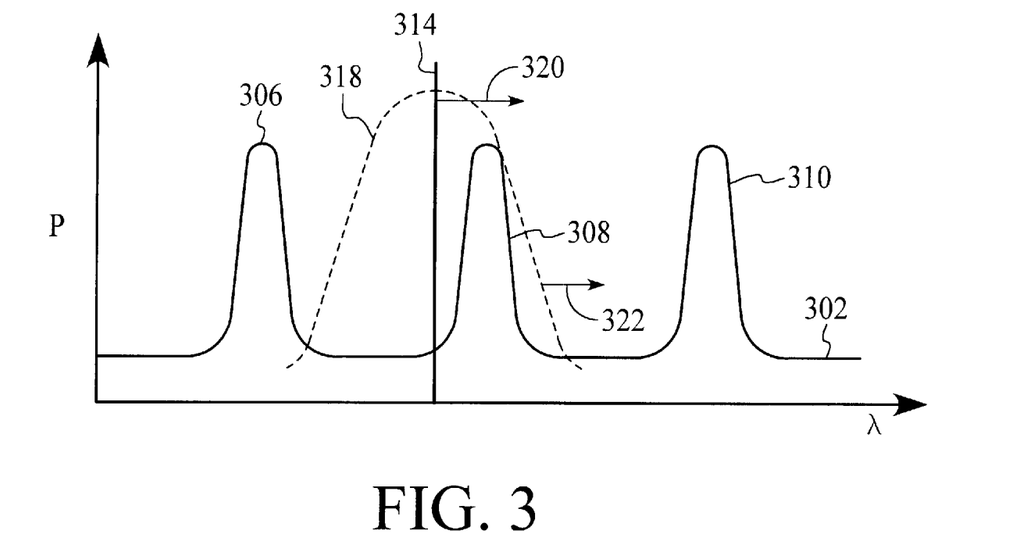
FIG. 3 is a graph of an unfiltered WDM input signal and a swept local oscillator signal in relation to the passband of an optical pre-selector that tracks the swept local oscillator signal.
Figure 4:
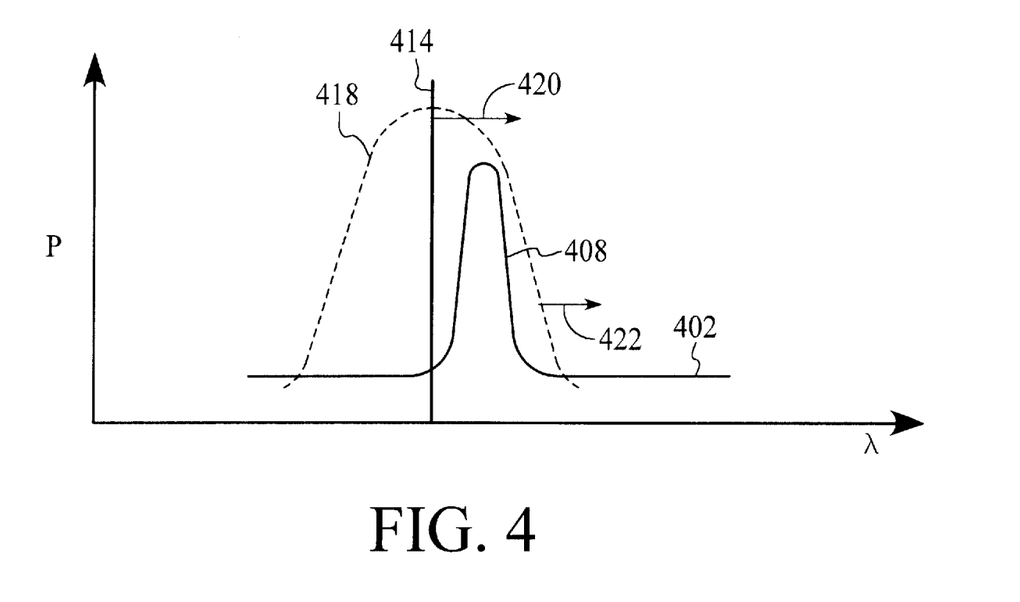
FIG. 4 is a graph of a filtered WDM input signal and a swept local oscillator signal in relation to the passband of an optical pre-selector that tracks the swept local oscillator.

Operation of the optical pre-selector 214 in a WDM system is depicted in the signal power vs. wavelength graphs of FIGS. 3 and 4. FIG. 3 depicts an input signal 302 as three optical carriers 306, 308, and 310 in a WDM system in relation to a swept local oscillator signal 314 before the combined input signal and swept local oscillator signal have entered the optical pre-selector. For example purposes, the dashed line 318 represents the passband of the optical pre-selector that is tuned to track the sweep of the local oscillator signals. Optical signals within the passband continue to be transmitted and optical signals outside of the passband are not transmitted. The sweep of the local oscillator signal and the tracking of the optical pre-selector passband are represented by the horizontal arrows 320 and 322 respectively.

FIG. 4 depicts the one optical carrier 408 that exits the optical pre-selector after the optical signals have been filtered. As shown by FIG. 4, the optical pre-selector filters out optical carriers that are not near the wavelength of the swept local oscillator signal 414 (i.e., outside the passband of the optical pre-selector). The optical carriers that are not near the wavelength of the swept local oscillator signal are not necessary for optical heterodyne detection and only contribute to noise in the detection system if not filtered. Optical bandpass filtering that tracks the wavelength of the swept local oscillator signal is especially useful when measuring broadband optical noise, such as amplified spontaneous emissions from an optical amplifier.

Referring to FIG. 2, the photodetector 212 is aligned to detect the filtered beam that is output from the optical pre-selector 214. The photodetector generates an electrical signal in response to the filtered beam. The electrical signal generated by the photodetector is provided to the processor 216. The connection between the photodetector and the processor is depicted in FIG. 2 by line 252. Although not shown, the photodetector may include additional circuitry such as signal amplifiers and filters, as is known in the field.

The processor 216 receives the electrical signal from the photodetector 212 and processes the electrical signal to determine an optical characteristic represented by the input signal. The processor may include analog signal processing circuitry and/or digital signal processing circuitry as is known in the field of electrical signal processing. In an embodiment, an analog signal from the photodetector is converted into digital signals and the digital signals are subsequently processed. It should be understood that digital signal processing involves converting the electrical signals from the photodetector into digital signals that are representative of the original electrical signal.

Figures 5, 6:
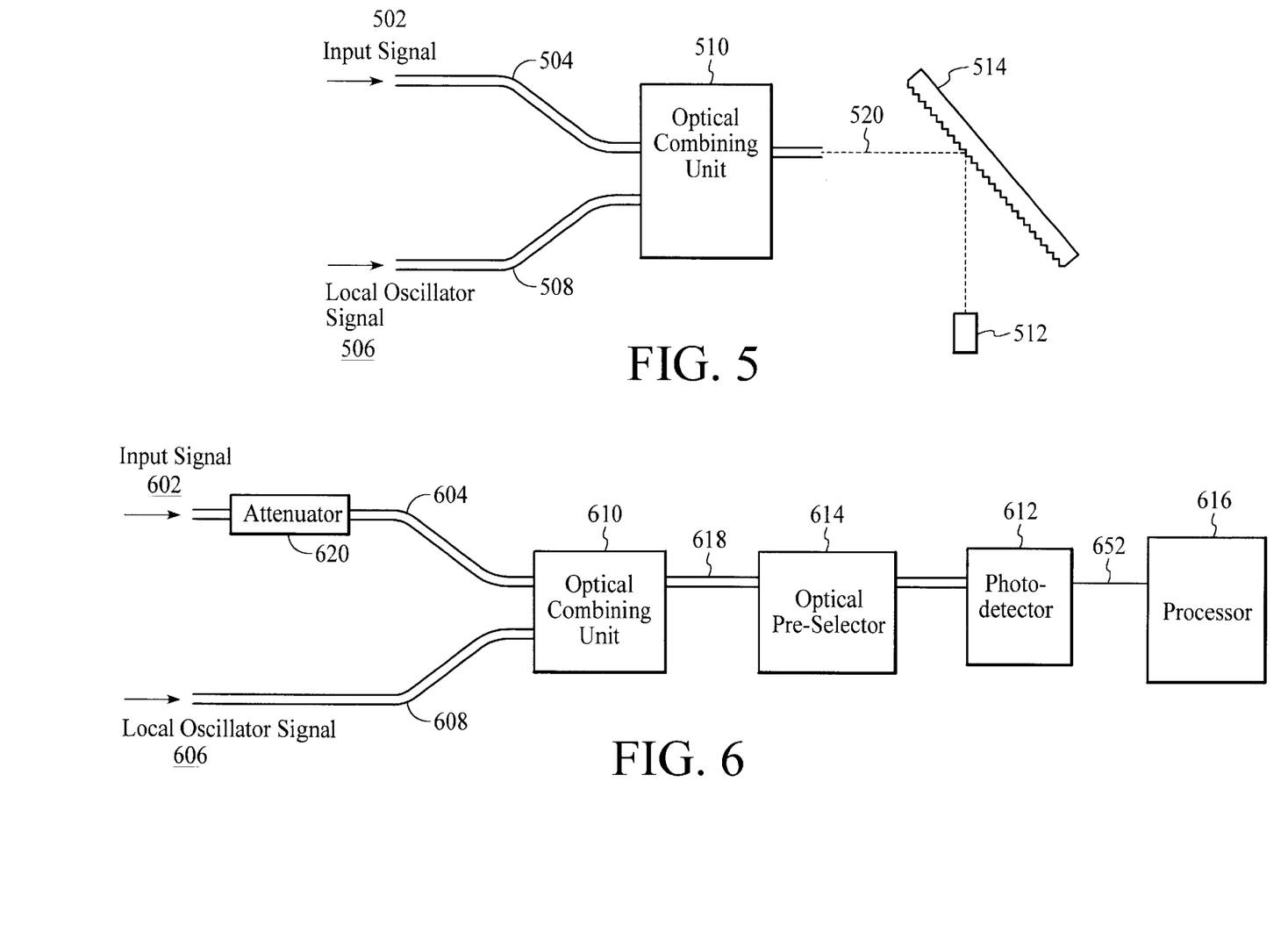
FIG. 5 is a depiction of a diffraction grating in relation to the optical combining unit and the photodetector that are described in the system depicted in FIG. 2.
FIG. 6 is a depiction of an optical heterodyne detection system that includes an optical attenuator, an optical combining unit, an optical pre-selector, and a photodetector in accordance with the invention.

An embodiment of an optical heterodyne detection system that includes a tunable diffraction grating is depicted in more detail in FIG. 5. As shown in FIG. 5, the combined input and swept local oscillator signals 520 exit the optical combining unit 510 and contact the tunable diffraction grating 514. The tunable diffraction grating is tuned to pass a wavelength band that tracks the wavelength of the swept local oscillator signal. In an embodiment, the diffraction grating is tuned by adjusting the angle of the diffraction grating with respect to the incident beam. The filtered beam that reflects off of the diffraction grating is directed to the photodetector 512 for optical detection. A tunable diffraction grating may be utilized in the same fashion in embodiments that include more than one beam.

Operation of the optical heterodyne detection system described with reference FIGS. 2–4 involves combining the input signal 202 and the swept local oscillator signal 206 into a combined optical signal and outputting a beam of the combined optical signal to the optical pre-selector 214. The output beam is then filtered by the optical pre-selector 214. The optical pre-selector passes a wavelength band that tracks the swept local oscillator signal. The filtered beam is then detected by the photodetector 212 and the photodetector generates an electrical signal in proportion to the intensity of the filtered beam. The electrical signal generated by the photodetector is then received by the processor 216 and processed to determine an optical characteristic represented by the input signal. Preferably, during operation, the center wavelength of the optical pre-selector passband tracks, in real-time, the wavelength of the swept local oscillator signal. As is described below, the system may require an initial calibration operation in order to provide accurate results.

The combination of the optical combining unit, the optical pre-selector, and the photodetector creates an optical heterodyne detection system that filters the combined optical signal to reduce noise and improve the dynamic range of the system.

In an embodiment, the optical heterodyne detection system includes an optical attenuator associated with the input signal. FIG. 6 is a depiction of an optical heterodyne detection system similar to the system of FIG. 2 that includes an optical attenuator 620 on the signal fiber 604. In an embodiment, the attenuator is integrated into the input fiber in order to attenuate the input signal 602. Attenuating the input signal reduces the intensity noise that is generated by the input signal during detection. The particular type of attenuator is not critical and therefore various types of attenuators, as are known in the field of optical attenuation, may be utilized. Preferably, the attenuator is adjustable such that the level of attenuation can be varied as needed to control the intensity of the input signal that is passed to the optical combining unit 610. In an embodiment, the attenuator can be adjusted to completely block transmission of the input signal. Completely blocking transmission of the input signal can be useful during system calibration, as is described below.

Figure 7:
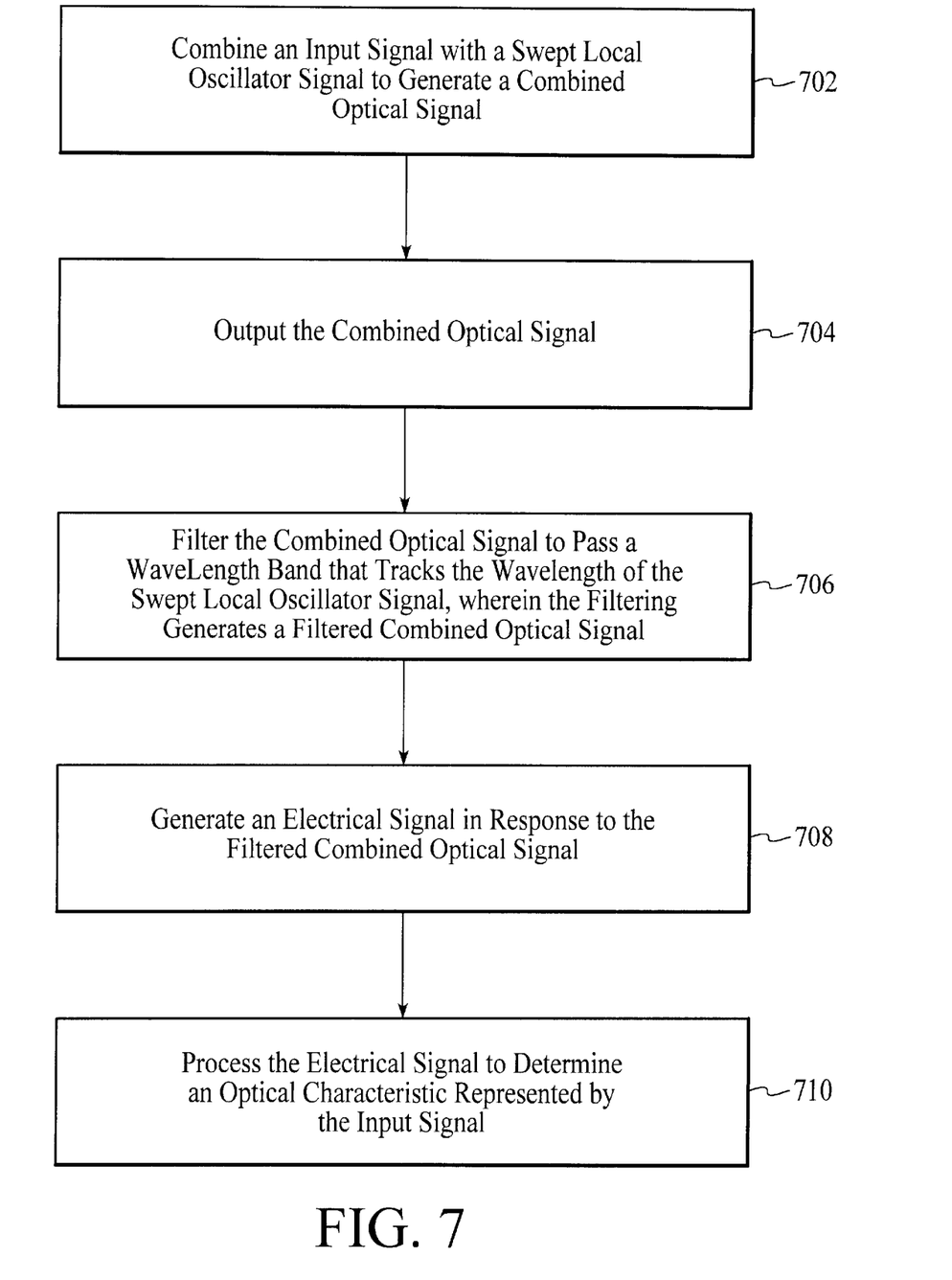
FIG. 7 is a process flow diagram of a method for monitoring an input signal utilizing optical heterodyne detection in which the input signal is filtered after the input signal and the local oscillator signal are combined in accordance with the invention.

A method for monitoring an optical signal utilizing an optical heterodyne detection system with optical pre-selection is described herein and depicted in the process flow diagram of FIG. 7. In a step 702, an input signal is combined with a swept local oscillator signal to generate a combined optical signal. In a step 704, the combined optical signal is output. In a step 706 the combined optical signal is filtered to pass a wavelength band that tracks the wavelength of the swept local oscillator signal and the filtering generates a filtered combined optical signal. In a step 708, an electrical signal is generated in response to the filtered combined optical signal. In a step 710, the electrical signal is processed to determine an optical characteristic represented by the input signal.

In an embodiment, filtering of the combined optical signal is adjusted in realtime to track the wavelength change of the swept local oscillator signal. In an embodiment, the input signal is attenuated before the input signal is combined with the swept local oscillator signal.

Figure 8:
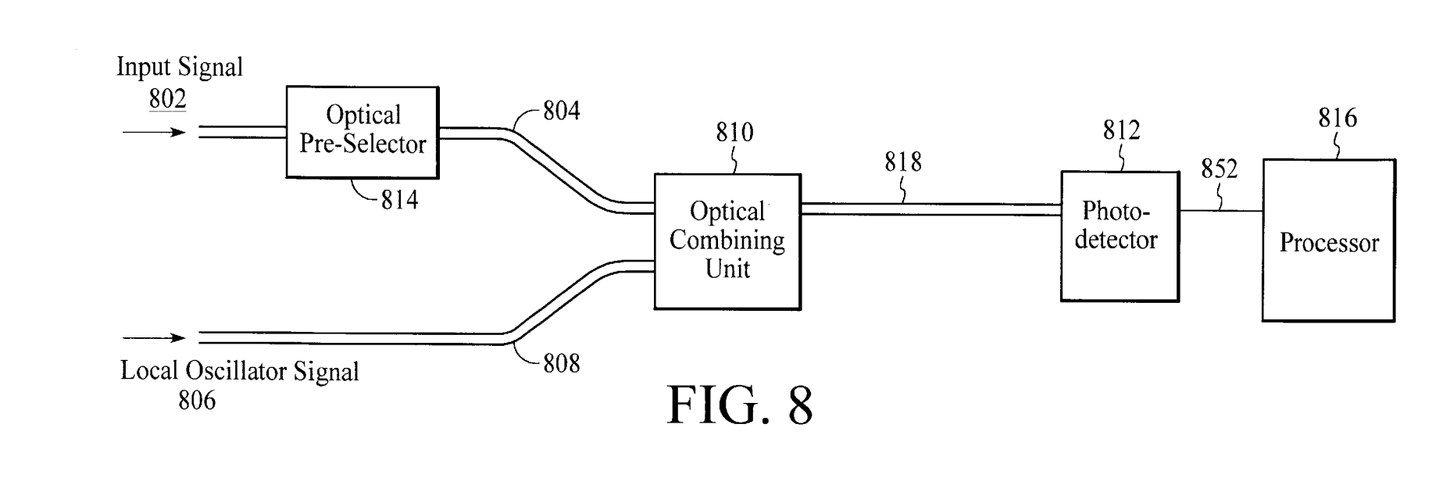
FIG. 8 is a depiction of an optical heterodyne detection system that includes an optical pre-selector, an optical combining unit, and a photodetector in accordance with the invention.

FIG. 8 depicts an embodiment of an optical heterodyne detection system in which the input signal 802 is filtered before the input signal is combined with a swept local oscillator signal 806. The optical heterodyne detection system of FIG. 8 includes the input signal, a signal fiber 804, an optical pre-selector 814, the local oscillator signal, a local oscillator fiber 808, an optical combining unit 810, a photodetector 812, and a processor 816. In contrast to the optical heterodyne detection system of FIG. 2, the optical pre-selector is located along an optical path that is before the optical combining unit and filters only the input signal. Although the optical pre-selector is located before the optical combining unit, the description of the individual elements is similar to the descriptions provided with reference to FIGS. 2–5.

Operation of the optical heterodyne detection system described with reference to FIG. 8 involves filtering the input signal 802 with the optical pre-selector 814 before the input signal is combined with the local oscillator signal 806. The optical pre-selector passes the filtered input signal in a wavelength band that tracks the swept local oscillator signal. The filtered input signal is combined with the swept local oscillator signal to generate a combined optical signal. A beam of the combined optical signal is then detected by the photodetector 812 and the photodetector generates electrical signals in proportion to the intensity of the beam. The electrical signals generated by the photodetector are then received by the processor 816 and processed to determine an optical characteristic represented by the input signal. Preferably, during operation, the center wavelength of the optical pre-selector passband tracks, in real-time, the wavelength of the swept local oscillator signal. As is described below, the system may require an initial calibration operation in order to provide accurate results.

The combination of the optical pre-selector 814, the optical combining unit 810, and the photodetector 812 creates an optical heterodyne detection system that filters the input signal before it is combined with the swept local oscillator signal 806 to reduce noise and improve the dynamic range of the system.

Figure 9:
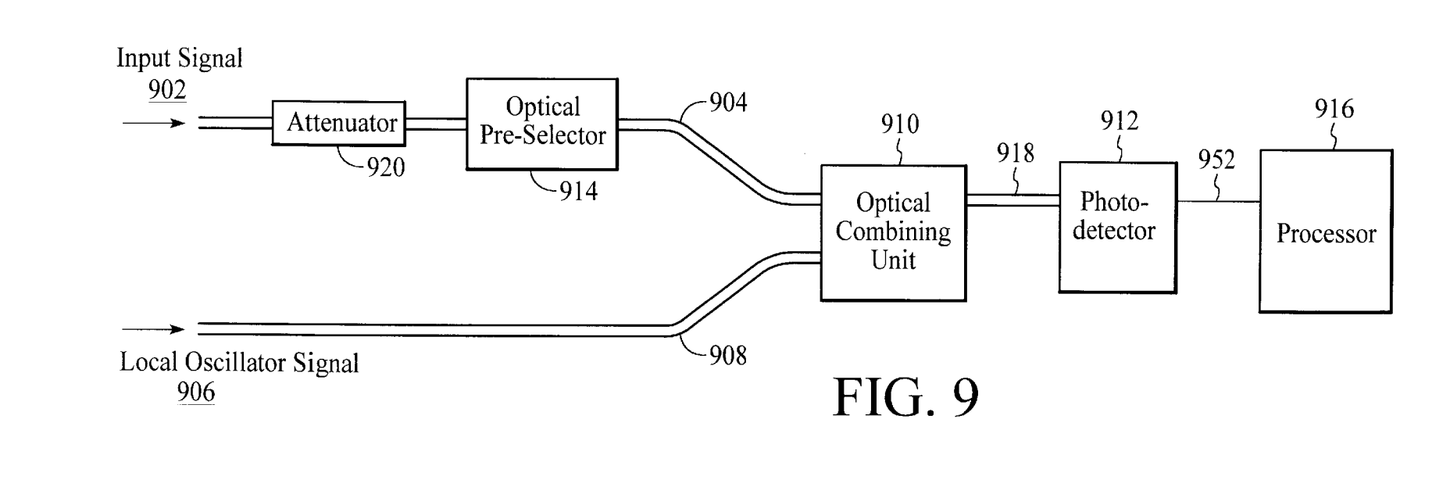
FIG. 9 is a depiction of an optical heterodyne detection system that includes an optical attenuator, an optical pre-selector, an optical combining unit, and a photodetector in accordance with the invention.

In an embodiment, the optical heterodyne detection system includes an optical attenuator associated with the input signal. FIG. 9 is a depiction of an optical heterodyne detection system similar to the system of FIG. 8 that includes an optical attenuator 920 on the signal fiber 904. In an embodiment, the attenuator is integrated into the signal fiber in order to attenuate the input signal 902. Attenuating the input signal reduces the intensity noise that is generated by the input signal during detection. The particular type of attenuator is not critical and therefore various types of attenuators, as are known in the field of optical attenuation, may be utilized. Preferably, the attenuator is adjustable such that the level of attenuation can be varied as needed to control the intensity of the input signal that is passed to the optical combining unit 910. In an embodiment, the attenuator can be adjusted to completely block transmission of the input signal. Completely blocking transmission of the input signal can be useful during system calibration, as is described below.

Figure 10:
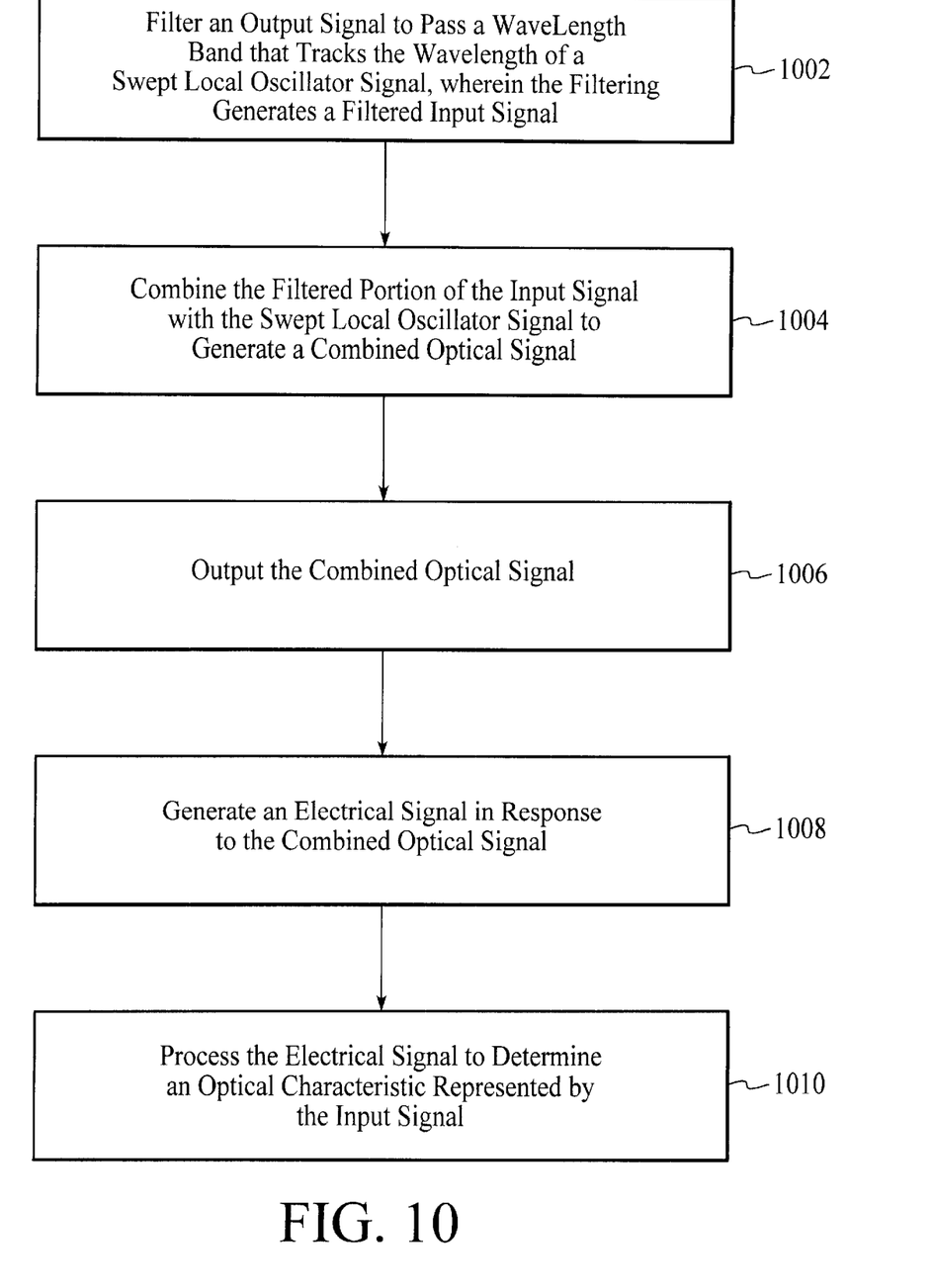
FIG. 10 is a process flow diagram of a method for monitoring an input signal utilizing optical heterodyne detection in which the input signal is filtered before the input signal and the local oscillator signal are combined in accordance with the invention.

A method for monitoring an optical signal utilizing an optical heterodyne detection system with optical pre-selection is described herein and depicted in the process flow diagram of FIG. 10. In a step 1002, an input signal is filtered to pass a wavelength band that tracks the wavelength of a swept local oscillator signal and the filtering generates a filtered input signal. In a step 1004, the filtered input signal is combined with the swept local oscillator signal to generate a combined optical signal. In a step 1006, the combined optical signal is output. In a step 1008, an electrical signal is generated in response to the combined optical signal. In a step 1010, the electrical signal is processed to determine an optical characteristic represented by the input signal.

In an embodiment, filtering of the input signal is adjusted in real-time to track the wavelength change of the swept local oscillator signal. In an embodiment, the input signal is attenuated before the input signal is combined with the swept local oscillator signal.

In the systems and methods that are described with reference to FIGS. 6, 7, 9, and 10, the attenuator may be utilized to selectively block transmission of the input signal for calibration. For example, while the input signal is blocked, the coupling coefficient of the optical combing unit can be determined as a function of wavelength by sweeping the local oscillator signal across a range of wavelengths. In addition, the responsivity of the photodetector can be determined as a function of wavelength by sweeping the local oscillator signal while the input signal is blocked. Further in the embodiment of FIG. 6, the optical pre-selector can be calibrated by blocking the input signal and passing the known local oscillator signal through the optical pre-selector.

Although not depicted in the systems of FIGS. 2, 6, 8, and 9, an optical pre-selector that tracks the wavelength of the swept local oscillator signal may alternatively be applied to the swept local oscillator signal itself in order to minimize noise that may be present in the local oscillator signal.

Figure 11:
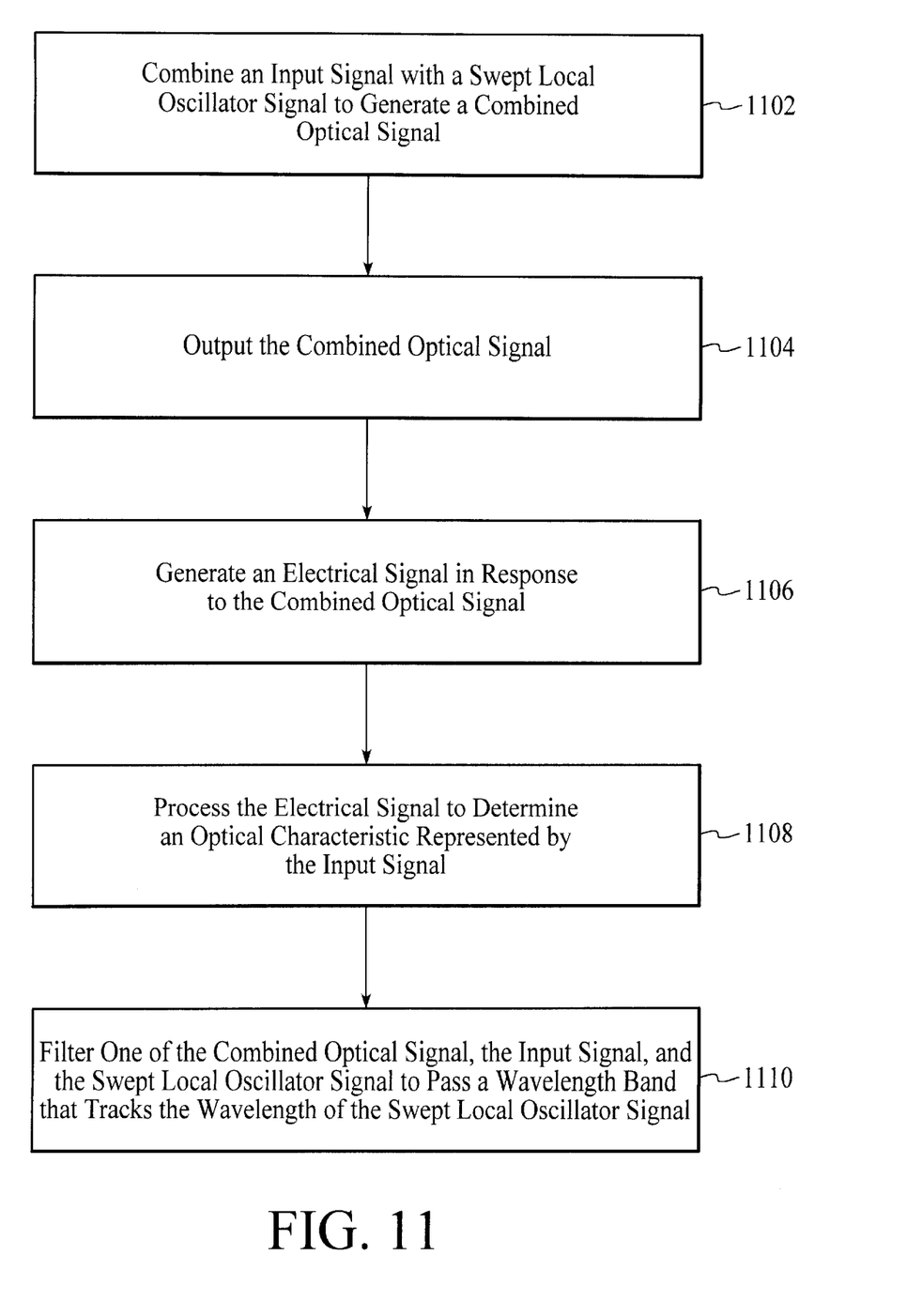
FIG. 11 is a process flow diagram of a method for monitoring an input signal utilizing optical heterodyne detection in which either the combined optical signal, the input signal, or the swept local oscillator signal is filtered in accordance with the invention.

Additionally, although not described in the methods depicted in FIGS. 7 and 10, the swept local oscillator signal may alternatively be filtered to pass a wavelength band that tracks the wavelength of the swept local oscillator signal. FIG. 11 is a process flow diagram depicting a heterodyne detection method that allows filtering of either the combined optical signal, the input signal, or the swept local oscillator signal. In a step 1102, the input signal is combined with the swept local oscillator signal to generate a combined optical signal. In a step 1104, the combined optical signal is output. In a step 1106, an electrical signal is generated in response to the combined optical signal. In a step 1108, the electrical signal is processed to determine an optical characteristic represented by the input signal. In a step 1110, one of the combined optical signal, the input signal, and the swept local oscillator signal is filtered to pass a wavelength band that tracks the wavelength band of the swept local oscillator signal.

What is claimed is:

1. A system for optical heterodyne detection comprising:
    a first optical path for carrying an input signal;
    a second optical path for carrying a swept local oscillator signal;
    optical combining means for combining said input signal and said swept local oscillator signal into a combined optical signal;
    a third optical path for carrying said combined optical signal;
    a photodetector optically arranged to receive said combined optical signal from said third optical path, said photodetector generating an electrical signal in response to said combined optical signal; and
    an optical pre-selector optically arranged to filter an optical signal within one of said first, second, and third optical paths, said optical pre-selector having a passband that tracks the wavelength of said swept local oscillator signal, said optical pre-selector outputting a filtered portion of said optical signal.

2. The system of claim 1 wherein said optical pre-selector is optically arranged to filter said combined optical signal within said third optical path.

3. The system of claim 1 wherein said optical pre-selector is optically arranged to filter said input signal within said first optical path.

4. The system of claim 1 further including an attenuator connected to attenuate said input signal before said input signal is combined with said swept local oscillator signal.

5. The system of claim 1, in which said optical pre-selector includes a tunable diffraction grating.

6. The system of claim 1 further including a processor for determining an optical characteristic represented by said input signal in response to said electrical signal.

7. A method for monitoring an optical signal utilizing optical heterodyne detection, the method comprising:
    combining an input signal with a swept local oscillator signal to generate a combined optical signal;
    outputting said combined optical signal;
    generating an electrical signal in response to said combined optical signal;
    processing said electrical signal to determine an optical characteristic represented by said input signal; and
    filtering one of said combined optical signal, said input signal, and said swept local oscillator signal to pass a wavelength band that tracks the wavelength of said swept local oscillator signal.

8. The method of claim 7 wherein said step of filtering is a step of filtering said combined optical signal to generate a filtered combined optical signal and wherein said step of generating is a step of generating an electrical signal in response to said filtered combined optical signal.

9. The method of claim 7 wherein said step of filtering is a step of filtering said input signal to generate a filtered input signal and wherein said step of combining is a step of combining said filtered input signal with said swept local oscillator signal to generate said combined optical signal.

10. The method of claim 7 further including a step of adjusting said filtering in real-time to track the wavelength change of said swept local oscillator signal.

11. The method of claim 7 further including a step of attenuating said input signal before said input signal is combined with said swept local oscillator signal.

12. The method of claim 7 further including the steps of:
    blocking transmission of said input signal before said input signal is combined with said swept local oscillator signal; and
    calibrating electrical signals that are generated in response to said swept local oscillator signal.

* * * * *